March 9, 1948.  J. AKSLEN  2,437,235
CORNER ASSEMBLY AND FASTENING MEANS FOR KNOCKDOWN COUNTERS AND THE LIKE
Filed Aug. 17, 1944  2 Sheets-Sheet 1
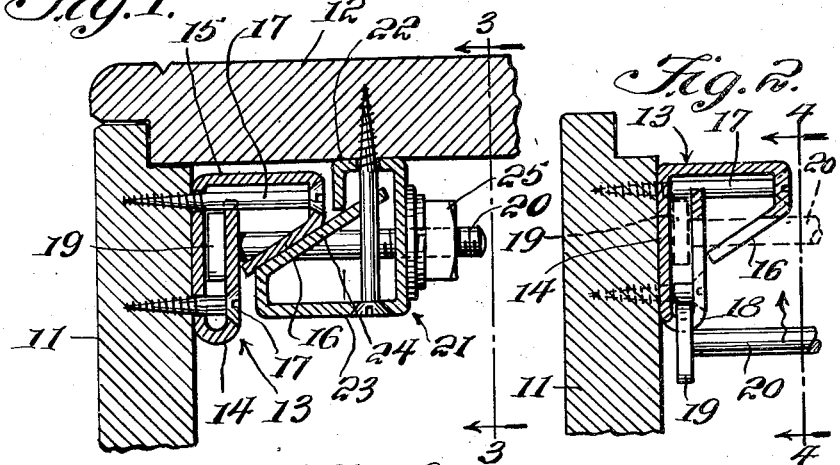
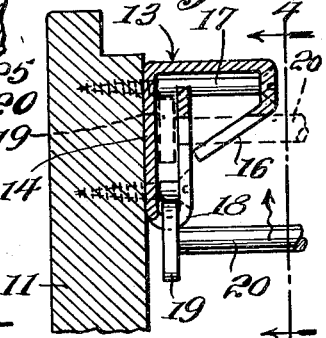
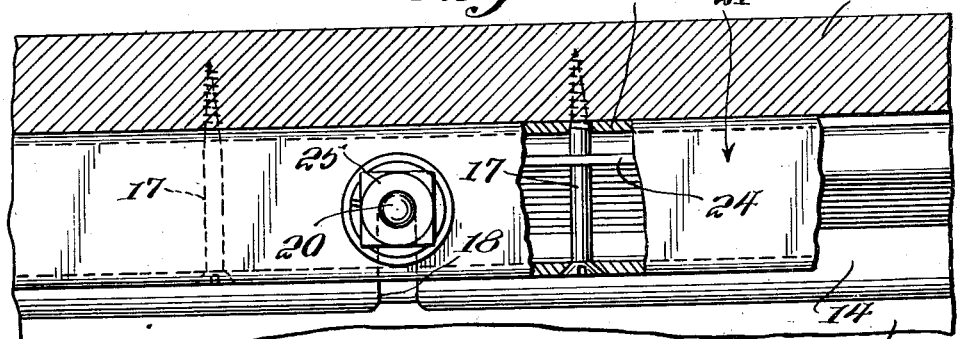
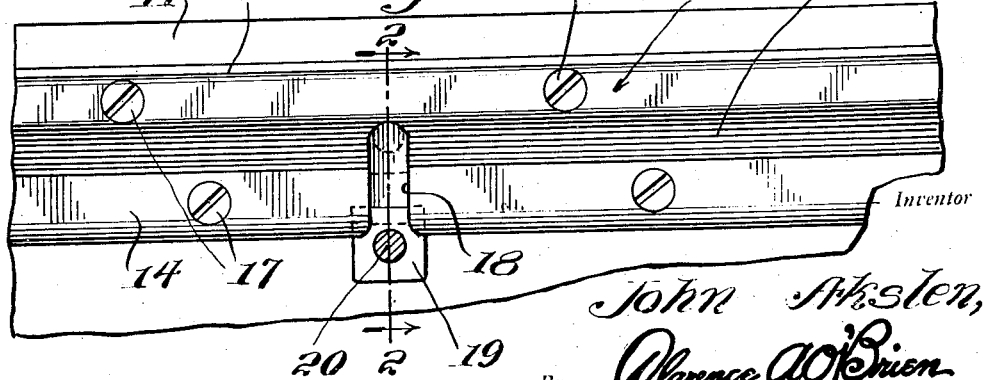
Inventor
John Akslen,
By Clarence A. O'Brien
and Harvey B. Jacobson
Attorneys March 9, 1948. J. AKSLEN 2,437,235
CORNER ASSEMBLY AND FASTENING MEANS FOR KNOCKDOWN COUNTERS AND THE LIKE
Filed Aug. 17, 1944 2 Sheets-Sheet 2
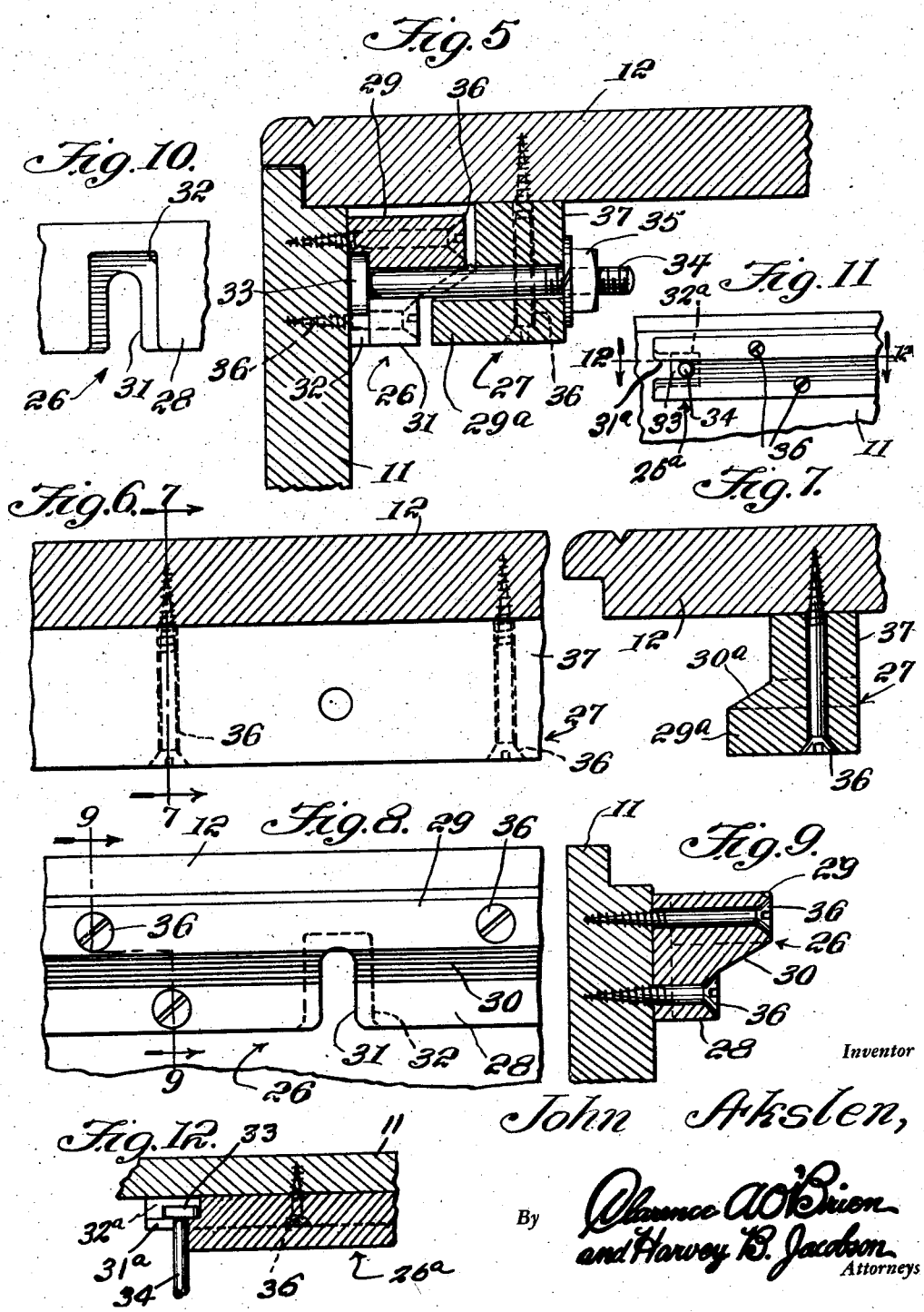
Inventor
John Akslen,
By Clarence A. O'Brien
and Harvey B. Jacobson
Attorneys Patented Mar. 9, 1948

2,437,235

UNITED STATES PATENT OFFICE 2,437,235

CORNER ASSEMBLY AND FASTENING MEANS FOR KNOCKDOWN COUNTERS AND THE LIKE

John Akslen, Minneapolis, Minn.

Application August 17, 1944, Serial No. 549,922

6 Claims. (Cl. 312—145)

1

This invention relates to furniture in general but particularly to store furniture such as counters, tables, benches and so on, and the primary purpose of the invention is to provide novel and improved especially constructed devices for securely assembling and maintaining the parts in relatively fixed relationship.

An outstanding object of the invention is to provide simple and expedient means for accomplishing the ends desired, the element comprising the means, collectively speaking, being such as to be permanently attached to the counter sections at the factory so as to permit said parts to be shipped and stored in compact requirement and to thereafter permit said parts to be securely assembled for use in the store.

In carrying out the principles of the invention I have devised two forms or styles, one of coacting metal parts and the other of similarly fashioned coacting wooden parts.

Generically speaking, the invention is characterized by longitudinal runners or rails screwed or otherwise fastened to the table or counter parts, these having inter-connecting beveled surfaces forming appropriate inter-related abutments calculated to distribute stress and strain and to retain the parts in firmly assembled relationship.

Other features and advantages will become more readily apparent from the following description and the accompanying illustrative drawings.

In the drawings, wherein like numerals are employed to designate like parts throughout the same—

Figure 1 is a fragmentary cross-sectional view through horizontal and vertical members of what may be described as a store counter, said view showing the coacting parts of the assembling rails or runners in section and elevation.

Figure 2 is a cross-section taken on the plane of the line 2—2 of Figure 4.

Figure 3 is a section on the line 3—3 of Figure 1, looking in the direction of the arrows.

Figure 4 is a fragmentary elevational view on the plane of the line 4—4 of Figure 2.

Figure 5 is a view like Figure 1 showing a modified form of the invention, this being the wooden style.

Figure 6 is a view observing the arrangement seen in Figure 7 in a direction from right to left.

Figure 7 is a cross-section on the plane of the line 7—7 of Figure 6, looking in the direction of the arrows.

2

Figure 8 is an elevation of Figure 9 observing the latter in a direction from right to left.

Figure 9 is a cross-section on the irregular line 9—9 of Figure 8, looking in the direction of the arrows.

Figure 10 is a fragmentary detail elevational view showing the rabbeted keeper notch provided in one of the rails.

Figure 11 is a view similar to Figure 8, showing a further modification of the invention.

Figure 12 is a section taken on line 12—12 of Figure 11.

Generically the invention hereinafter described and claimed has to do with a novel corner assembly and fastening means for knock down counters and the like which is characterized, briefly, by a pair of right angularly disposed furniture or equivalent and complemental parts together with assembling and securing means for said parts, the means comprising a pair of opposed longitudinally extending and companion rails, said rails being structurally and individually distinct and each rail being detachably secured to one of the respective furniture parts, each rail being provided with an edge extension constituting a bevelled abutment and the two rails being opposed in substantial parallelism with their respective abutments overlapping one another, one of said rails being provided with a recess and a coacting and aligned slot and there being a headed rail assembling and connecting bolt having its head anchored in the portion forming the recess, the shank portion of the bolt extending through the slot and also through and beyond the other rail and being secured to the latter rail.

Attention is first invited to the metal form of the structure seen in Figures 1 to 4, inclusive. By way of introduction it is to be pointed out that the invention is adaptable to tables, counters, benches, and so forth. It is sufficient to describe the invention here as applicable to a counter and, therefore, the counter parts are denoted and distinguished by the numerals 11 and 12, these having their meeting or adjacent edge portions forming a scarf-joint.

The rail attached to the part 11 is denoted by the numeral 13 and this is bent up from sheet metal which is bent upon itself to define a channel-shaped portion 14, an overlying right angular flange 15 and an inclined inturned flange 16, the latter directed toward and terminating in spaced relation from the adjacent inner wall of said channel. This flange 16 constitutes an abutment. These parts of the unit or rail 13 are secured against the part 11 by screws or equivalent fasteners 17. The bight portion and inner wall of said channel are slotted in a manner to provide a recess to accommodate the head 19 of the assembling bolt 20. It is evident from Figures 1 and 2 that the head 19 of the bolt is slipped up into said recess and held in place in the seat portion of the slot 18 as shown to advantage in Figure 1.

The complemental runner or rail 21 is also fashioned from a single sheet of metal and is characterized by a U-shaped or channel portion 22, a horizontal flange 23 at the bottom and an inclined companion flange 24 which has its free edge portion extending and projecting into the channel 22 and its major intermediate portion so angled as to form a complemental or associate abutment to engage the abutment flange 16 already described. It follows that two rails 13 and 21 have overlapping interfitting relationship, each being bolted to its respective part and both rails being then assembled by placing a clamping nut 25 on the threaded end of the assembling bolt 20. They are so designed in cross-sectional shape as to provide for proper mating and companion relationship. In both instances the so-called "channels" constitute ways-and-means of satisfactorily fastening the rails to the parts 11 and 12.

In Figures 5 to 10, inclusive, the two mating and coacting rails or runners are made of wood and are distinguished by the numerals 26 and 27, respectively. These parts are approximately the same in cross-sectional form and the part 26 as shown in Figure 9 comprises a body portion 28 and an outstanding extension 29 having a beveled surface 30 forming an inclined abutment. This rail 26 is also provided with a keeper slot 31 having a rabbeted seat 32 forming a recess to accommodate the head 33 of the assembling bolt 34. The bolt passes through a bolt hole in each coacting rail and is secured in place by a clamping nut 35 as shown in Figure 5. Both rails are secured to their respective counter parts 11 and 12 by wood screws 36.

The rail 27, as shown in Figure 7, comprises a body portion 37 and an extension 29a similar to the extension 29, this having a bevel 30a forming a ledge or abutment to coact with the first-named abutment 30. These wooden rails also interfit in overlapping relationship.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Referring to Figures 11 and 12, the rail or runner 26a is secured to the counter part 11 by screws 36, and has a keeper notch 31a in each end thereof. The notch 31a has a rabbeted seat 32a forming a recess to receive the head 33 of bolt 34.

I claim:

1. As a new article of manufacture and a component part of a structural assemblage of the class described, an elongated rail for attachment to a counter or equivalent part and to assist in combining, binding and fastening said part to a complemental counter or equivalent part comprising an elongated sheet metal rail including two main flanges at right angles to each other, the free longitudinal edge portion of one flange being bent upon itself inwardly to define a channel opening through the other flange, the bight portion and inner wall of said channel being slotted to provide keeper means for the headed end and shank portion of an assembling and clamping bolt, and the free longitudinal edge portion of the remaining flange being bent longitudinally and then laterally and inwardly toward the first flange, the free edge of the inwardly bent portion terminating in close proximity to the inner wall of said channel, and the same defining an inclined play take-up and clamping abutment.

2. As a new article of manufacture and as a component part of the structural assemblage of the class described, a sheet metal rail for attachment to a counter part and adapted for co-action with a rail attached to second and right angularly disposed counter part, said rail being made up primarily of body-forming flanges disposed at approximate right angles to each other, the free longitudinal edge portion of one of said flanges being bent upon itself to define a longitudinally extending channel, the corresponding edge portion of the remaining flange being laterally and inwardly bent and inclined toward said remaining flange, the inclined portion extending into said channel and constituting a play take-up and clamping abutment.

3. A knockdown store counter corner assembly of the class described comprising a counter part adapted for vertical disposition, the upper end thereof being rabbeted, a corner fastening rail secured to an inner face of said part in close proximity to and extending longitudinally with the rabbeted edge, a second counter part disposed at right angles to the first named part and having its edge portion rabbeted, the rabbeted edges of the respective parts being adjoined in a scarf-joint, a second rail connected to the underside of said second named part and disposed alongside of said first named rail, adjacent portions of the respective rails being provided with inclined abutments and said abutments being disposed in overlapping and interfitting relationship, and bolts secured in and fastening said rails together in assembled relationship, said bolts being disposed at right angles to the longitudinal dimensions of the respective rails so that when tightened, the abutments produce a slack take-up and clamping action.

4. In a structural assemblage of the class described, a pair of right angularly disposed co-acting furniture parts, and complemental retaining rails thereon, each rail being of wood and of a cross-sectional form to provide an inclined projecting abutment, the respective abutments being disposed in overlapping relationship and detachably bolted together, one of said rails being provided with a keeper notch and a recess in alignment with said notch, the notch and recess serving to accommodate the head and shank respectively of the assembling bolt, the remaining rail being provided with a bolt hole, and a headed bolt having its screw threaded nut equipped end mounted in said bolt hole, the headed end being removably lodged in said notch, said bolt being thus carried by the rail on which it is mounted.

5. In a structural assemblage of the class described, a pair of right angularly related coacting furniture parts, and complemental assembling and retaining rails, one rail being mounted on each of said parts and each rail being of wood and of a cross-sectional form to provide an inclined projecting abutment, the respective abutments being disposed in overlapping relationship, a headed assembling bolt for said parts and rails, one of said rails being provided with a keeper slot and a recess in alinement with said slot, the slot and recess serving to accommodate the head and shank respectively of said assembling bolt, the headed end of said bolt being seated in said recess, the adjacent shank portion being situated in said slot, and the threaded, nut-equipped end of the shank being detachably connected with the remaining rail.

6. In a structural assemblage of the class described, in combination, a pair of right angularly disposed furniture or equivalent and complemental parts, and assembling and securing means for said parts, said means comprising a pair of opposed longitudinally extending companion rails, said rails being structurally and indivdually distinct and each rail being detachably secured to one of the respective furniture parts, each rail being provided with a beveled abutment, and the two rails being opposed in substantial parallelism with their respective abutments overlapping one another, one of said rails being provided with a keeper recess and an alined and coacting slot, a headed rail assembling and connecting bolt having its head anchored in said recess, the shank extending through said slot and also through and beyond the other rail and being secured thereto.

JOHN AKSLEN.

REFERENCES CITED

The following references are of record in the file of this patent:

UNITED STATES PATENTS

| Number | Name | Date |
| --- | --- | --- |
| 765,930 | Mahony | July 26, 1904 |
| 835,582 | Tobey | Nov. 13, 1906 |
| 968,850 | Hunter | Aug. 30, 1910 |
| 1,257,097 | Morris | Feb. 19, 1918 |
| 1,394,338 | Nyman | Oct. 18, 1921 |
| 1,729,268 | Henderson | Sept. 24, 1929 |
| 2,174,180 | Rand | Sept. 26, 1939 |